United States Patent [19]
Shimomura

[11] Patent Number: 6,115,707
[45] Date of Patent: Sep. 5, 2000

[54] ADDRESS READING APPARATUS AND RECORDING MEDIUM ON WHICH A PROGRAM FOR AN ADDRESS READING APPARATUS IS RECORDED

[75] Inventor: Hideki Shimomura, Tokyo, Japan

[73] Assignee: NEC Corporation, Tokyo, Japan

[21] Appl. No.: 09/025,500

[22] Filed: Feb. 18, 1998

[30] Foreign Application Priority Data

Feb. 21, 1997 [JP] Japan ................................... 9-054173

[51] Int. Cl.⁷ .................................................. G06F 17/30
[52] U.S. Cl. ............................................... 707/6; 382/101
[58] Field of Search ........................... 700/213; 707/203, 707/6; 704/9; 382/101

[56] References Cited

U.S. PATENT DOCUMENTS

| | | | |
|---|---|---|---|
| 5,321,608 | 6/1994 | Namba | 704/9 |
| 5,642,519 | 6/1997 | Martin | 704/9 |
| 5,703,783 | 12/1997 | Allen | 700/213 |
| 5,754,671 | 5/1998 | Higgins | 382/101 |

FOREIGN PATENT DOCUMENTS

| | | |
|---|---|---|
| 4-98358 | 3/1992 | Japan . |
| 4-205457 | 7/1992 | Japan . |
| 6-20087 | 1/1994 | Japan . |
| 6-4717 | 1/1994 | Japan . |
| 6-44411 | 2/1994 | Japan . |
| 08030734 | 2/1996 | Japan . |
| 08171815 | 7/1996 | Japan . |
| 08243503 | 9/1996 | Japan . |
| 08243505 | 9/1996 | Japan . |

*Primary Examiner*—Wayne Amsbury
*Attorney, Agent, or Firm*—McGuire Woods

[57] ABSTRACT

The invention provides an address reading apparatus which can read an address correctly even if a correct address is not registered in habitation records to be compared with address word candidates. A supplementary address composition section compares a result of address word recognition with stored contents of a habitation record storage section to produce a read candidate while a word connection address composition section refers to the result of address word recognition and stored contents of an address rule storage section to produce a candidate, and an output discrimination section outputs that one of the two candidates from the supplementary address composition section and the word connection address composition section which exhibits a higher likelihood.

10 Claims, 17 Drawing Sheets

FIG. 2(a)

PLACE NAME

| | |
|---|---|
| Kanagawa – Ken | 神奈川県 — 2a |
| Kawasaki – Shi | 川崎市 |
| Miyamae –Ku | 宮前区 |
| Miyazaki | 宮崎 |
| Miyamaedaira | 宮前平 |
| | .... |

FIG. 2(b)

INDIVIDUAL NAME

| | |
|---|---|
| Taro Kawasaki | 川崎太郎 — 2b |
| Hanako Arima | 有馬花子 |
| Taro Nichirai | 日雷太郎 |
| Taro Nichiden | 日電太郎 |
| Saburo Sutsuki | 五月三郎 |
| Saburo Yayoi | 弥生三郎 |
| | .... |

BUILDING NAME

Satsuki – so
Yayoi – so
Ohka – so

DISTRICT PUNCTUATION

Chome
Banchi
Go

Goshitsu

Kawasaki – shi Miyamae – Ku Miyazaki

4 – 7 – 6 – 207

Taro Nichiden

FIG. 5(a)

| PLACE NAME | LIKELIHOOD |
|---|---|
| (川崎市　宮前区) 宮崎 — *(Kawasaki-shi Miyamae-Ku) Miyazaki* | 10 |
| (川崎市　宮前区) 宮前平 — *(Kawasaki-shi Miyamae-ku) Miyamaedaiva* | 8 |
| (川崎市　宮前区) 有馬 — *(Kawasaki-shi Miyamae-Ku) Arima* | 4 |

| BLOCK NUMBER | LIKELIHOOD |
|---|---|
| 4 | 10 |

| SUB-BLOCK NUMBER | LIKELIHOOD |
|---|---|
| 7 | 10 |
| 17 | 7 |

| HOUSE NUMBER | LIKELIHOOD |
|---|---|
| 6 | 5 |

| BUILDING NAME | LIKELIHOOD |
|---|---|
| ? | 0 |

| ROOM NUMBER | LIKELIHOOD |
|---|---|
| 207 | 10 |
| 201 | 5 |

| | INDIVIDUAL NAME | LIKELIHOOD |
|---|---|---|
| Taro Nichiden | 日電太郎 | 10 |
| Giro Merai | 目雷次郎 | 10 |

| RECORD NUMBER | PLACE NAME | BLOCK NUMBER | SUB-BLOCK NUMBER | HOUSE NUMBER | BUILDING | ROOM | INDIVIDUAL NAME |
|---|---|---|---|---|---|---|---|
| 0001 | 有馬 | 1 | 1 | 1 | | | 川崎太郎 |
| 0002 | 有馬 | 1 | 1 | 2 | | | 有馬花子 |
| ... | | | | | | | |
| 2014 | 宮崎 | 4 | 1 | 1 | | | 日雷次郎 |
| ... | | | | | | | |
| 2040 | 宮崎 | 4 | 7 | 5 | 五月荘 | 202 | 五月三郎 |
| ... | | | | | | | |
| 2135 | 宮崎 | 4 | 17 | 1 | 弥生荘 | 207 | 弥生三郎 |
| 2136 | 宮崎 | 4 | 17 | 2 | | | 如月次郎 |
| ... | | | | | | | |
| 3501 | 宮前平 | 1 | 2 | 3 | 桜花荘 | 201 | 日電太郎 |
| ... | | | | | | | |

6a — Taro Kawasaki
Hanako Arima
Giro Nichirai
Saburo Satsuki
Saburo Yayoi
Giro Kisaragi
Taro Nichiden Satsuki-so
Yayoi-so
Ohka-so Arima
Miyazaki
Miyamaedaira

FIG. 7

| RECORD NUMBER | SUM | PLACE NAME | BLOCK NUMBER | SUB-BLOCK NUMBER | HOUSE NUMBER | BUILDING | ROOM | INDIVIDUAL NAME |
|---|---|---|---|---|---|---|---|---|
| 0001 | 4 | 4 | 0 | 0 | 0 | 0 | 0 | 0 |
| 0002 | 4 | 4 | 0 | 0 | 0 | 0 | 0 | 0 |
| .. | .. |  |  |  |  |  |  |  |
| 2014 | 30 | 10 | 10 | 0 | 0 | 0 | 0 | 10 |
| .. | .. |  |  |  |  |  |  |  |
| 2040 | 30 | 10 | 10 | 10 | 0 | 0 | 0 | 0 |
| .. | .. |  |  |  |  |  |  |  |
| 2135 | 37 | 10 | 10 | 7 | 0 | 0 | 0 | 0 |
| 2136 | 27 | 10 | 10 | 7 | 0 | 0 | 0 | 0 |
| .. | .. |  |  |  |  |  |  |  |
| 3501 | 23 | 8 | 0 | 0 | 0 | 0 | 5 | 10 |
| .. | .. |  |  |  |  |  |  |  |

| RECORD NUMBER | PLACE NAME | BLOCK NUMBER | SUB-BLOCK NUMBER | HOUSE NUMBER | BUILDING | ROOM | INDIVIDUAL NAME | LIKELIHOOD |
|---|---|---|---|---|---|---|---|---|
| 2135 | 宮崎 | 4 | 17 | 1 | 弥生荘 | 207 | 弥生三郎 | 37 |

宮崎 — Miyazaki
8a
弥生荘 — Yayoi-so
弥生三郎 — Saburo Yayoi

FIG. 9

Table 9a — ADDRESS

| | PLACE NAME | BLOCK NUMBER | SUB-BLOCK NUMBER | HOUSE NUMBER | ROOM |
|---|---|---|---|---|---|
| Miyazaki | 宮崎 | 4 | 7 | 6 | 207 |
| Miyazaki | 宮崎 | 4 | 7 | 6 | 201 |
| Miyazaki | 宮崎 | 4 | 17 | 6 | 207 |
| | .. | | | | |
| Miyamaedaira | 宮前平 | 4 | 7 | 6 | 207 |
| Miyamaedaira | 宮前平 | 4 | 17 | 6 | 207 |
| | .. | | | | |
| Arima | 有馬 | 4 | 17 | 6 | 207 |
| | .. | | | | |

Table 9b — LIKELIHOOD

| PLACE NAME | BLOCK NUMBER | SUB-BLOCK NUMBER | HOUSE NUMBER | ROOM | TOTAL |
|---|---|---|---|---|---|
| 10 | 10 | 10 | 5 | 10 | 45 |
| 10 | 10 | 10 | 5 | 5 | 40 |
| 10 | 7 | 10 | 5 | 10 | 42 |
| | | | | | |
| 8 | 10 | 10 | 5 | 10 | 43 |
| 8 | 7 | 10 | 5 | 10 | 40 |
| | | | | | |
| 4 | 10 | 7 | 5 | 10 | 36 |
| | | | | | |

FIG. 10

| PLACE NAME | BLOCK NUMBER | SUB-BLOCK NUMBER | HOUSE NUMBER | ROOM | LIKELIHOOD |
|---|---|---|---|---|---|
| 宮崎 | 4 | 7 | 6 | 2 0 7 | 4 5 |

— Miyazaki

10a

ADDRESS READING APPARATUS AND RECORDING MEDIUM ON WHICH A PROGRAM FOR AN ADDRESS READING APPARATUS IS RECORDED

BACKGROUND OF THE INVENTION

1. Field of the Invention

This invention relates to a character recognition apparatus, and more particularly to an apparatus which reads an address using a character recognition technique.

2. Description of the Related Art

An address is composed of element words representing an urban or rural prefecture, a municipal district name, a street name, and a square (block, sub-block and house numbers), and further, in the case of a multiple dwelling house, a building name, a unit number. If the element words are determined uniquely, then an address can be defined uniquely.

However, with the character recognition technique at present, it is actually impossible to recognize all element words correctly and uniquely. Therefore, in reading of an address based on a character recognition technique, it is difficult to read an address correctly only if results of character recognition are outputted as they are in a train.

Against such a problem as just described, a system has been proposed wherein the reading accuracy is augmented by extracting element words which compose an address from results of character recognition and comparing the words with general rules of address composition (this will be hereinafter referred to as "prior art 1"). The prior art 1 is disclosed, for example, in a document (1), "OCR Address Reading/Letter Sorting Machine for the Ministry of Posts and Telecommunications of Japan", NEC Technical Report, Vol. 44, No. 3, pp. 25–30, another document (2), "Japanese Address Reader-Sorter, Model TR-17", Toshiba Review, Vol. 45, No. 2, pp. 149–152, and so forth.

Meanwhile, also a system wherein, taking notice of the characteristic that an address when superscribed is in most cases accompanied by an individual name, an organization name, a building name or the like, address data including an urban or rural prefecture to a room number, a building name, an organization name and an individual name are stored in advance and they are compared with results of character recognition to raise the reading accuracy has been proposed (this is hereinafter referred to as "prior art 2"). The prior art 2 is disclosed, for example, in a document (3), "A Knowledge Processing Based on Mutual Checking among Words for Hand-Written String Reading", Lecture Thesis Collection 2 of the 53rd National Meeting of the Information Processing Society of Japan, pp. 283–284.

Further, for example, in Japanese Patent Laid-Open Application No. Heisei 8-243503, as a main reading apparatus which augments the reliability in recognition of a block number, a sub-block number, a building number and so forth and reduces works by manual operation for correction of characters which cannot be read, a construction wherein detailed addresses including block numbers, sub-block numbers, building numbers, room numbers and so forth of addressees are stored as a dictionary and a detailed zip code corresponding to a district area of an address and an individual name of an addressee are read to produce sorting information including the detailed address of the addressee, and then the detailed address is compared with the detailed dictionary to read a block number, a sub-block number, a building number and a room number is proposed.

Furthermore, in Japanese Patent Laid-Open Application No. Heisei 8-243505, a construction of an address reading apparatus and method wherein representation patterns of habitation representation numbers are stored as dictionary words for which wild cards representing arbitrary numbers are used and a candidate character group of results of recognition and costs of words are calculated to effect comparison so that recognition of a habitation representation number can be performed rapidly and with a high degree of accuracy. The apparatus disclosed in the documents mentioned above can be regarded as techniques similar to the prior art 2 described above in that reading results of a district name and an individual name and habitation data stored in advance are compared with each other to presume a block number, a sub-block number and so forth.

However, the prior arts described above have the following problems.

First, the prior art 1 has a problem in that, where it is used by itself, there is a limitation in correction of or complement to a character recognition error or incomplete character recognition (disabled recognition). The reason is such as follows.

Indeed, where the fact that a place name has such a hierarchical relationship of an urban or rural prefecture, a municipal district name, a street name, and a square is utilized, even if place name words of an upper hierarchy cannot be read, the place name can be presumed from a lower hierarchy word or words.

However, it is impossible to uniquely presume a lower hierarchy from an upper hierarchy or hierarchies. Further, where a wide area which includes a plurality of municipal districts is determined as a reading object, words of a same notation sometimes have different upper hierarchy words, and an upper hierarchy word cannot be presumed uniquely only from a lower hierarchy word or words. Furthermore, if incomplete character recognition occurs with a square or a room number, then it is very difficult to presume the square or room number.

On the other hand, the prior art 2 improves the problems of the prior art 1 significantly by comparing an address with habitation data including redundant individual names, building names and organization names. For example, it is possible to presume, from an individual name, an upper hierarchy word or a square of a place name, which is not recognized fully.

However, the prior art 2 is based on a conception that a correct object is estimated by searching for habitation data most similar to results of character recognition or word candidates extracted from such character recognition results.

Therefore, if the prior art 2 is applied by itself, then the problem that, where a correct answer is not included in the habitation data, even if answers outputted as a result of character recognition are all correct, not a correct reading result, but a similar but wrong address is outputted arises.

Naturally, even this problem can be eliminated if the habitation data are complete. However, actually it is very difficult to prepare habitation data of an area of an object of reading correctly without exception.

SUMMARY OF THE INVENTION

It is an object of the present invention to provide an address reading apparatus which reads, if a correct answer is included in habitation data, an address correctly based on the habitation data, but can output, even if a correct answer is not included in the habitation data, a correct reading result if a character recognition result sufficient to allow correct reading is outputted and a recording medium on which a program for allowing such operation is recorded.

In order to attain the object described above, according to an aspect of the present invention, there is provided an address reading apparatus, comprising a word storage section in which words of elements which compose addresses each of which may make an object of recognition, an address rule storage section in which rules which may be used to combine words of elements which may form an address to compose an address are stored, word recognition means for referring to the word storage section and the address rule storage section to recognize element words of an address from within an image of a reading object, a habitation record storage section in which records of habitations which exist as combinations of the words stored in the word storage section are stored, supplementary address composition means for comparing word candidates outputted from the word recognition means and the records stored in the habitation record storage section with each other and outputting one of the records which exhibits the highest likelihood, word connection address composition means for combining the word candidates outputted from the word recognition means to compose address candidates and referring to the address rule storage section to detect and output one of the address candidates which exhibits the highest likelihood, and output discrimination means for statistically judging the address candidate outputted from the supplementary address composition means, the address candidate outputted from the word connection address composition means and the likelihoods of the individual address candidates to determine a final address reading result and outputting the final address reading result.

Preferably, the output discrimination means outputs the address candidate outputted from the supplementary address composition means if the likelihood of the address candidate outputted from the supplementary address composition means is equal to or higher than a threshold value determined in advance, but outputs the address candidate outputted from the word connection address composition means if the likelihood of the address candidate outputted from the supplementary address composition means is lower then the threshold value.

Alternatively, the address reading apparatus may be constructed such that the output discrimination means outputs the address candidate outputted from the word connection address composition means if the likelihood of the address candidate outputted from the word connection address composition means is equal to or higher than a threshold value determined in advance, but outputs the address candidate outputted from the supplementary address composition means if the likelihood of the address candidate outputted from the word connection address composition means is lower then the threshold value.

Preferably, the output discrimination means compares a value obtained by multiplying the likelihood of the address candidate outputted from the supplementary address composition means by a fixed coefficient with the likelihood of the address candidate outputted from the word connection address composition means and outputs that one of the candidates which exhibits the higher value.

Preferably, the output discrimination means compares a value obtained by multiplying the likelihood of the address candidate outputted from the supplementary address composition means by a fixed coefficient with the likelihood of the address candidate outputted from the word connection address composition means and holds that one of the candidates which exhibits the higher value as a temporary candidate, and the output discrimination means outputs the temporary candidate if the temporary candidate is equal to or higher than a threshold value determined in advance, but outputs nothing if the temporary candidate is lower than the threshold value.

With the address reading apparatus, when an address is read, element words which compose the address are recognized together with likelihoods, and candidates obtained as a result of the recognition are compared with the actually existing address records stored in the habitation record storage section to detect and output one of the records which exhibits the highest degree of coincidence as a candidate of a discrimination result. Meanwhile, processing of comparing candidates obtained by connecting element words with the address rules stored in the address rule storage section to detect and output one of the candidates of the result of the discrimination which exhibits the highest likelihood is performed, and a result of the processing is compared with the candidate of the discrimination result in detail by the output discrimination section. Consequently, the address reading apparatus is advantageous in that address reading with a high degree of accuracy can be achieved. The reason is described below.

In particular, where a correct answer is not stored in the habitation record storage section, even if element words of an address can all be recognized correctly, a correct answer cannot be obtained by the supplementary address production processing. However, with the address reading apparatus according to the present invention, since it additionally includes the means for composing an address by connecting the word candidates, even if a correct answer is not stored in the habitation record storage section, a correct reading result can be obtained.

According to another aspect of the present invention, there is provided a recording medium on which a program is recorded which causes an information processing apparatus to execute a word recognition step wherein a word storage section in which words of elements which compose addresses each of which may make an object of recognition and an address rule storage section in which rules which may be used to combine words of elements which may form an address to compose an address are stored are referred to to recognize element words of an address from within an image of a reading object, a supplementary address composition step wherein word candidates obtained as a result of the word recognition step and records stored in a habitation record storage section, in which records of habitations which exist as combinations of the words stored in the word storage section are stored, are compared with each other and one of the records which exhibits the highest likelihood is outputted, a word connection address composition step wherein the word candidates obtained as a result of the word recognition step are combined to compose address candidates and the address rule storage section is referred to to detect and output one of the address candidates which exhibits the highest likelihood, and an output discrimination step wherein the address candidate obtained as a result of the word recognition step, the address candidate obtained as a result of the word connection address composition step, and the likelihoods of the individual address candidates are statistically judged to determine a final address reading result and the final address reading result is outputted.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2(a) to 2(d) are schematic views illustrating examples of words stored in a word storage section of the address reading apparatus of FIG. 1;

FIG. 4 is a schematic view showing an example of a reading object pattern;

FIGS. 5(a) to 5(g) are schematic illustrations showing examples of output of a word recognition section shown in FIG. 1;

FIG. 6 is a schematic view illustrating an example of a habitation record storage section of the address reading apparatus of FIG. 1;

FIG. 7 is a diagrammatic view illustrating processing of a supplementary address production section shown in FIG. 1;

FIG. 8 is a schematic view showing an example of output of the supplementary address production section shown in FIG. 1;

FIG. 9 is a diagrammatic view illustrating an example of likelihood calculation processing of a word connection address production section shown in FIG. 1;

FIG. 10 is a diagrammatic view illustrating an example of output of the word connection address production section shown in FIG. 1.

DESCRIPTION OF THE PREFERRED EMBODIMENT

Figure 1:
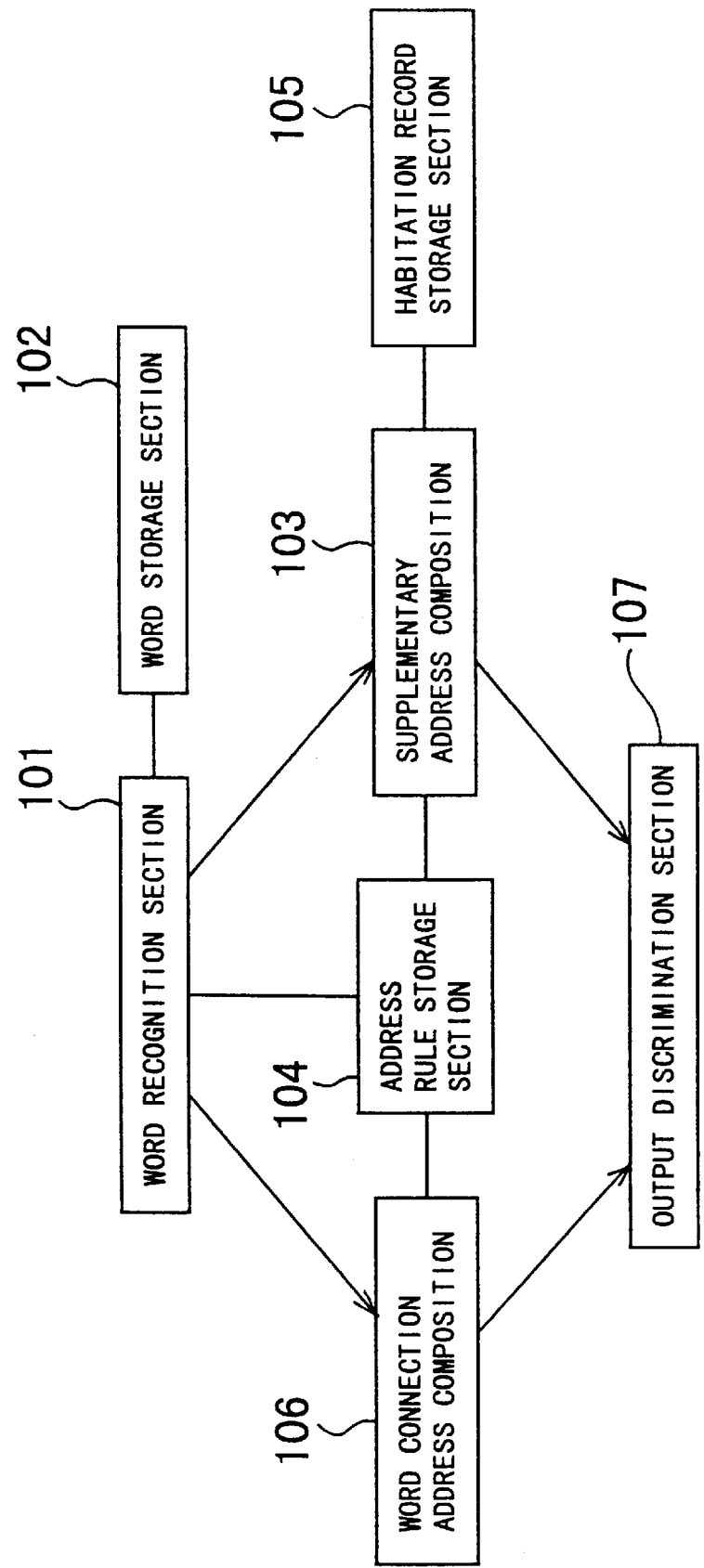
FIG. 1 is a block diagram of an address reading apparatus showing a first preferred embodiment of the present invention.

Referring first to FIG. 1, there is shown in block diagram a construction of an address reading apparatus to which the present invention is applied. The address reading apparatus shown includes a word recognition section 101, a word storage section 102, a supplementary address composition section 103, an address rule storage section 104, a habitation record storage section 105, a word connection address composition section 106 and an output discrimination section 107.

The word storage section 102 stores all element words which may possibly make elements of addresses. They are, for example, the urban or rural prefecture, municipal district name, street name, square number (block, sub-block and house numbers), square punctuation marks, building name, room number, individual name, corporation name and so forth. They may be stored in the same area or otherwise may be stored in different areas for different kinds. Further, since the block, sub-block, house and room numbers are combinations of numerals, they may not be stored explicitly in a dictionary, but may be substituted, for example, by such a rule that "any train of numerals is regarded as a block, sub-block, house or room number".

The address rule storage section 104 stores rules among words which compose an address. Roughly, three rules are involved.

The first rule provides such hierarchical relationship information between place names that, for example, an urban or rural prefecture is followed by a municipal district name, which in turn is followed by a street name. For example, the information represents that the upper element of the street name of "Miyazaki" is the municipal district name of "Kawasaki-shi", the upper element of which in turn is the rural prefecture name of "Kanagawa-ken".

The second rule provides such square composition rule information that a block number is followed by a punctuation mark, which in turn is followed by a sub-block number.

The third rule provides information of square ranges and notations for individual street names. The information may be, for example, the street of "Miyazaki (Miyamae-ku, Kawasaki-shi, Kanagawa-ken)" includes 1st to 5th blocks, each including first to 21st sub-blocks". Further, if necessary, physical arrangement information of an address such as, for example, information that an ordinary address is represented by a district, square, building name, room number, and individual name in order may be stored additionally.

The habitation record storage section 105 stores information of habitations which are actually present as combinations of the element words stored in the word storage section 102. For example, the habitation record storage section 105 stores information of a habitation such that words are arrayed like "Kanagawa-ken", "Kawasaki-shi", "Miyamae-ku", "Miyazaki", "4", "1", "1", "Taro Nichiden". This information represents that Taro Nichiden lives at No. 1-1 (sub-block 1, house number 1), Miyazaki 4-chome (block 4), Miyamae-Ku (Miyamae street), Kawasaki-shi (Kawasaki municipal district), Kanagawa-ken (Kanagawa prefecture)". It is to be noted that punctuation marks for the square need not be stored in the habitation record storage section 105.

The word recognition section 101 refers to the word storage section 102 and, if necessary, also to the address rule storage section 104 to recognize element words in a recognition object image inputted. Then, the word recognition section 101 outputs a plurality of word candidates together with respective word likelihoods calculated from likelihoods of character recognition, coincidence degrees between character recognition results and the words and adaptations with the address rules.

The supplementary address composition section 103 compares the word candidates outputted from the word storage section 102 with the stored contents of the habitation record storage section 105 and extracts a habitation data base record, which exhibits the highest coincidence degree, as a supplementary address candidate. When necessary, the supplementary address composition section 103 refers also to the address rule storage section 104 to select a candidate and outputs the resulting candidate.

Further, the supplementary address composition section 103 provides a likelihood, which is calculated from the word likelihoods obtained by the word storage section 102 and the coincidence degrees between the habitation data base record and the word candidates, to the supplementary address candidate.

The word connection address composition section 106 couples the word candidates outputted from the word storage section 102 in accordance with the rules stored in the address rule storage section 104 to compose word connection address candidates and provides likelihoods, which are calculated from the word likelihoods obtained by the word storage section 102 and the adaptations with the rules of the address rule storage section 104, to the individual word connection address candidates. Then, the word connection address composition section 106 outputs one of the word connection address candidates which exhibits the highest likelihood.

The output discrimination section 107 statistically compares the candidate and the likelihood of the candidate outputted from the supplementary address composition section 103 and the candidate and the likelihood of the candidate outputted from the word connection address composition section 106 with each other to select a candidate which seems to be appropriate, and outputs the thus selected candidate.

In the following, a concrete example of operation of the address reading apparatus of the present embodiment when it reads an address in a certain district borne on paper is described below with reference to the drawings. More particularly, operation when a place name, a square, a building name, a room number and an individual name are element words and an imaginary address in "神奈川県川崎市宮前区" (Kanagawa-ken (prefecture), Kawasaki-shi (municipal district), Miyamae-ku (ward)) is read is described.

A pattern of the reading object is inputted, for example, from an optical pattern inputting apparatus and is forwarded to the word recognition section 101 which recognizes elements which compose an address.

The word recognition section 101 performs cutting out and recognition processing of individual characters of the inputted pattern and refers to the word storage section 102 and the address rule storage section 104 to recognize various words. As a minimum construction, the words in the word storage section 102 should be successively compared with character recognition candidates and similar words should be listed as candidates. However, since this method does not involve restriction information regarding connection of words, there is the possibility that many unnecessary candidates may be outputted. Therefore, the word recognition section 101 refers to the connection information representative of hierarchical relationships of place names stored in the address rule storage section 104, the composition rule for squares and so forth to restrict candidates in accordance with the necessity.

For the method of recognizing address elements from an inputted image in this manner, any practically usable known technique such as the technique disclosed in the document (1) or the document (2) mentioned hereinabove may be used. It is to be noted that, although a method of recognizing an individual name, a building name or a room number is not explicitly disclosed in the document (1) or (2), a similar method to that for a place name can be used for an individual name and a building name. Meanwhile, a building number or a room number can be recognized by processing similar to that for a square.

The word recognition section 101 outputs, as a result of the processing, a plurality of word candidates together with individual likelihoods which are calculated from the likelihoods of the character recognition, adaptations with the words in the word storage section 102, adaptations with the rules in the address rule storage section 104 and so forth.

Figure 2C:
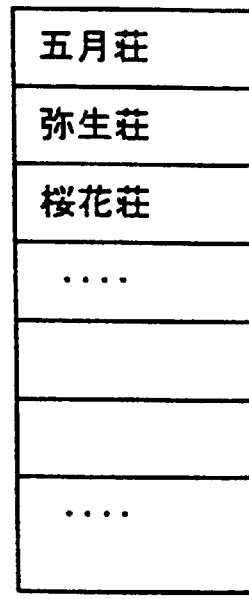
Figure 2D:
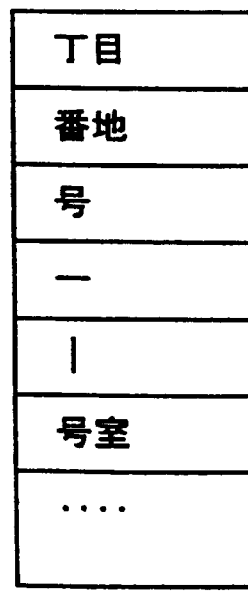

FIGS. 2(*a*) to 2(*d*) illustrate an example of stored contents of the word storage section 102. In the word storage section 102, place names 2*a,* individual names 2*b,* building names 2*c* and square punctuation marks 2*d* are stored. For numerals in a square, the rule that "a numeral train including one or more numerals is regarded as a square number" is substituted.

Figure 3A:
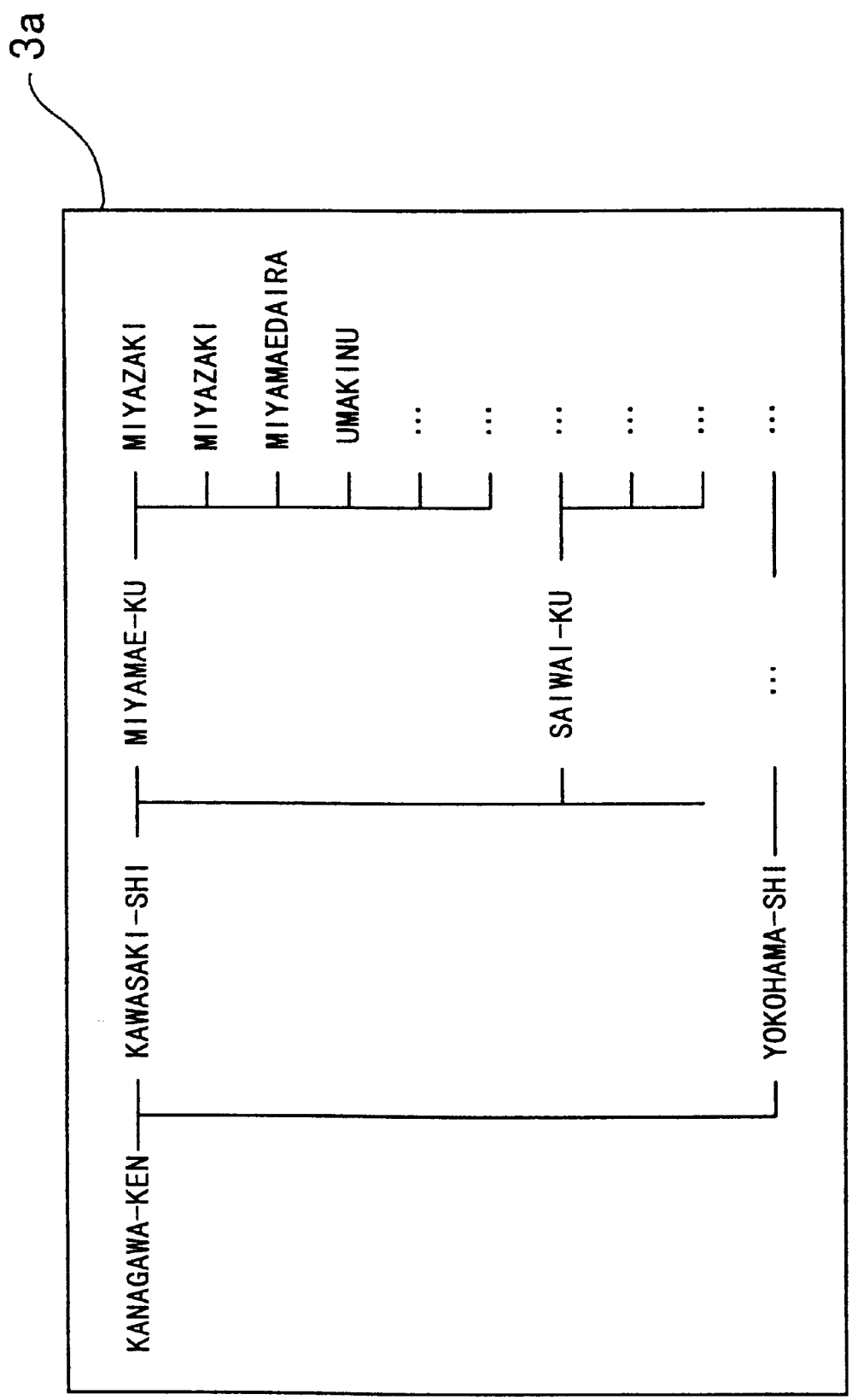
FIGS. 3(a) and 3(b) are diagrammatic views illustrating an example of rules stored in an address rule storage section of the address reading apparatus.
Figure 3B:
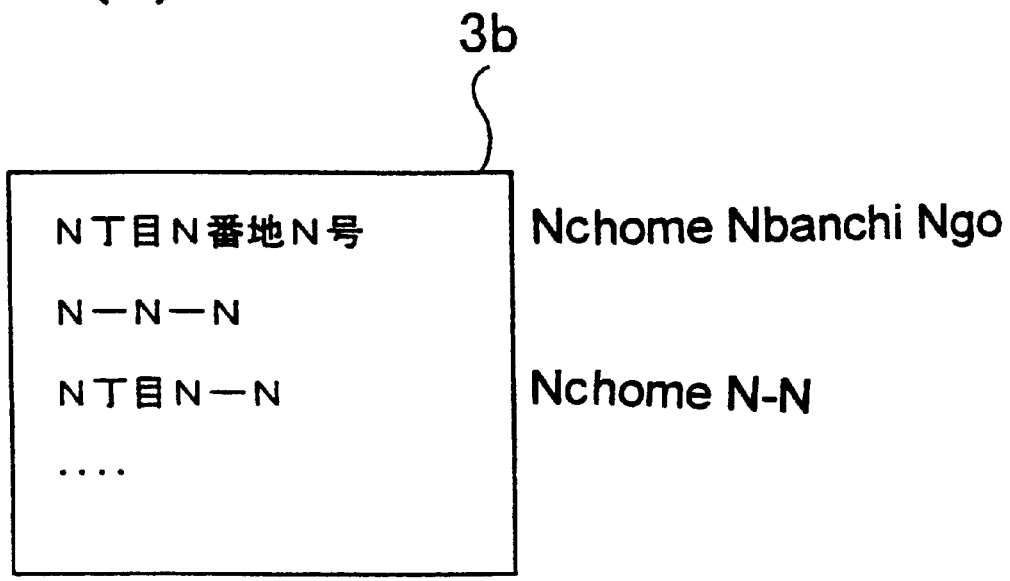

FIGS. 3(*a*) and 3(*b*) illustrate an example of stored contents of the address rule storage section 104 of FIG. 1. In the address rule storage section 104, a place name hierarchical structure rule 3*a* and a square composition rule 3*b* are stored.

Referring to FIG. 3(*a*), the place name hierarchical structure rule 3*a* is represented as an example wherein such a hierarchical relationship as "Kanagawa-ken —Kawasaki-shi —Miyamae-ku —Miyazaki" is stored efficiently in a tree structure.

Referring to FIG. 3(*b*), in the square composition rule 3*b,* N signifies a numeral train, and for example, "N丁目N,番地N号" (N-chome (block), N-banchi (sub-block), N-go (house)) indicates that a square is composed by 'a numeral train followed by the word "丁目" (chome), another numeral train following the word "丁目" and followed by the word "番地" (banchi), and a further numeral train following the word "番地" and followed by the word "号" (house)'.

An example of output when an example of reading object pattern 4*a* shown in FIG. 4 is inputted to the word recognition section 101 where the example of word storage section 102 shown in FIGS. 2(*a*) to 2(*d*) and the example of address rule storage section 104 shown in FIGS. 3(*a*) and 3(*b*) are used is shown in FIGS. 5(*a*) to 5(*g*).

Referring to FIGS. 4 and 5(*a*) to 5(*g*), in the example shown, recognition candidates of the place name, block number, sub-block number, house number, room number and individual name are outputted. Since no building name is included in the example of the reading object pattern 4*a* illustrated in FIG. 4, no word has been recognized successfully therefor, and accordingly, the mark "?" representing a failure in recognition is outputted. Simultaneously, also likelihoods of character recognition and word likelihoods calculated based on coincidence degrees with the words are outputted. For example, in regard to the place name candidates, "Miyazaki" has been recognized with the likelihood of 10, "Miyamaedaira" with the likelihood of 9 and "Arima" with the likelihood of 4.

It is to be noted that, in the present embodiment, since reading of an address within a limited range of a municipal district is presumed, it is necessary and sufficient only if the lowest hierarchy element (street name) is discriminated, and therefore, in the following description, a recognition result of a place name is represented by a street name.

Referring back to FIG. 1, the word candidates with word likelihoods outputted from the word recognition section 101 are forwarded to the supplementary address composition section 103.

The supplementary address composition section 103 searches for a habitation record which exhibits the highest coincidence degree with the word candidates from within the habitation record storage section 105 and determines the habitation record as an address candidate.

FIG. 6 is a diagrammatic view illustrating an example of stored contents of the habitation record storage section 105 of FIG. 1. Referring to FIG. 6, for example, the first row (entry of the first row) represents that "川崎太郎" (Taro Kawasaki) lives in (Kawasaki-shi, Miyamae-ku) "有馬(Arima), 1-chome (block), 1-banchi (sub-block), 1-go (house)." Each blank place indicates that there is no pertaining element. The item (column) of recorded number represents a number for convenience of processing for uniquely determining a record (one entry). It is to be noted that, for a method of effecting correct reading of an address by comparing word candidates which form an address with habitation record information, description of the document (3) mentioned hereinabove should be referred to.

FIG. 7 illustrates an example of contents of processing performed by the supplementary address composition section 103 which receives the example of word candidates illustrated in FIG. 5 and refers to the example of the habitation record storage section 105 illustrated in FIG. 6.

The word candidates are successively extracted and compared with the pertaining items of the habitation record storage section 105, and if coincident items are detected then sums of the likelihoods of them and the recognition likelihoods are defined and calculated as likelihoods of the individual records.

In a likelihood sum column 7b of FIG. 7, the record number 2,135 has acquired the highest point 37 whose details are 10 for the place name, 10 for the block number, 7 for the sub-block number, 0 for the house number, 0 for the building number, 10 for the room number, and 0 for the individual name.

If the example of the stored contents of the habitation record storage section 105 illustrated in FIG. 6 is referred to in accordance with the record number (=2,135), then a corresponding supplementary address candidate is obtained.

As a result, the supplementary address composition section 103 outputs, as seen in FIG. 8, "宮崎 4丁目 17番地 1 (号弥生荘) 207 (弥生三郎)" (Miyazaki 4-chome (block), 17-banchi (sub-block), 1-go (house), (Yayoi-so) 207, (Saburo Yayoi)). The address can be determined uniquely even if the elements in the parentheses are not explicitly given.

While the output of the supplementary address composition section 103 illustrated in FIG. 8 is not a correct reading result as can be seen from comparison with the address character train shown in FIG. 4, this is a problem which arises from the fact that a correct reading result is not stored in the habitation record storage section 105.

The word candidates with likelihoods outputted from the word recognition section 101 are forwarded also to the word connection address composition section 106. The word connection address composition section 106 combines address composition elements such as the place name, square, room number and so forth to compose address candidates. Simultaneously, the word connection address composition section 106 calculates likelihoods of the address candidates based on the likelihoods attached to the individual word candidates and adaptations of them with the address rules and adds the thus calculated likelihoods to the address candidates to be outputted.

Referring to FIG. 9, reference symbol 9a denotes an example of address candidates outputted from the word connection address composition section 106 where the example of word candidates illustrated in FIG. 5 is inputted and the stored contents of the address rule storage section 104 are referred to. Further, reference symbol 9b of FIG. 9 denotes an example of calculation when likelihoods of words which compose an address candidate are added to define a likelihood of the entire address candidate.

For example, in the case of the candidate of "宮前区宮崎 4丁目 7番地 6号 207室" (Miyamae-ku (ward), Miyazaki 4-chome (block), 7-banchi (sub-block), 6-go (house), 207-goshitsu (room)) illustrated in FIG. 9, since the likelihood is 10 for the place name, 10 for the block number, 10 for the sub-block number, 5 for the house number, and 10 for the room number, the likelihood of the entire address candidate is 45 which is the sum total of the values.

When a candidate should be selected from among a plurality of candidates, one of the candidates which has the highest likelihood is not always selected, but the candidate may be abandoned by referring to the address rule storage section 104 to check the range of values of districts existing in the street of the street name.

In the example described, if all of the candidates satisfy the value range matching requirements of the street name and the square, then, as seen from FIG. 10, "宮前区宮崎 4丁目 7番地 6号 207号室" (Miyamae-ku (ward), Miyazaki 4-chome (block), 7-banchi (sub-block), 6-go (house), 207-goshitsu (room)) which has acquired the highest point is outputted together with the likelihood of 45 as a word connection address candidate.

Referring back to FIG. 1, the output discrimination section 107 statistically evaluates the supplementary address candidate and the likelihood of the supplementary address candidate outputted from the supplementary address composition section 103 and the word connection address candidate and the likelihood of the word connection address candidate outputted from the word connection address composition section 106, and outputs a final address reading discrimination result.

Figure 11:
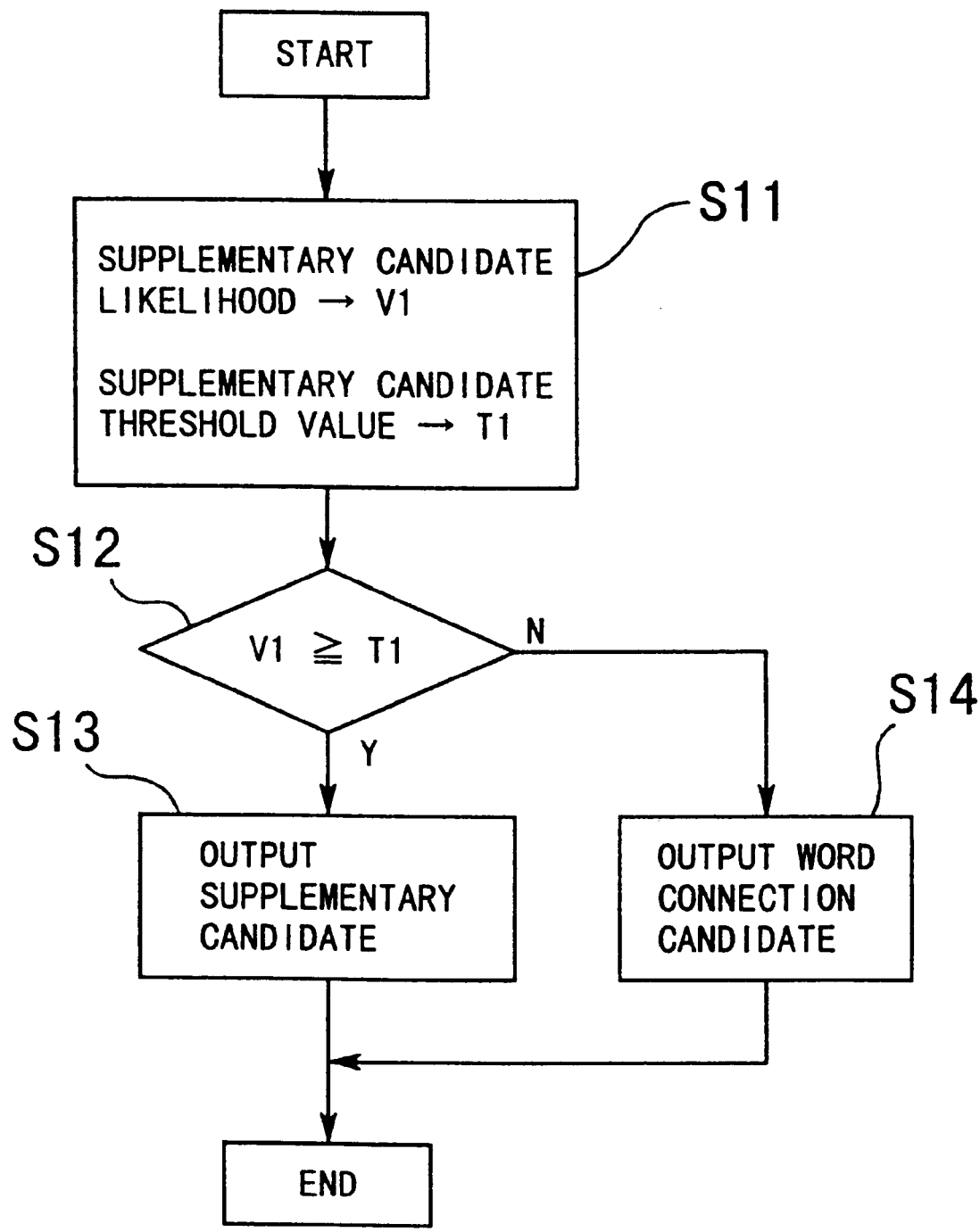
FIGS. 11 to 14 are flow charts illustrating different examples of processing operation of an output discrimination section shown in FIG. 1.

FIG. 11 is a flow chart illustrating an example of processing operation of the output discrimination section 107. Referring to FIG. 11, a likelihood of a candidate outputted from the supplementary address composition section 103 is first placed into a variable V1, and a threshold value for the candidate is placed into a variable T1 (step S11).

If V1 is equal to or higher than T1, that is, if the likelihood is equal to or higher than the threshold value therefor (step S12), then the output discrimination section 107 outputs the address candidate outputted from the supplementary address composition section 103 (step S13). On the other hand, if V1 is lower than T1, that is, if the likelihood is lower than the threshold value therefor, then the supplementary address composition section 103 conversely outputs an address candidate outputted from the word connection address composition section 106 (step S14)

Accordingly, if the example 8a of FIG. 8 which is an output of the supplementary address composition section 103 and the example 10a of FIG. 10 which is an output example of the word connection address composition section 106 are discriminated with the threshold value T1=40 in the flow chart of FIG. 11, then since the variable V1 is 37 and is not equal to or higher than the threshold value therefor, the candidate "宮前区宮崎 4丁目 7番地 6号 207号室" (Miyamae-ku (ward), Miyazaki 4-chome (block), 7-banchi (sub-block), 6-go (house), 207-goshitsu (room)) outputted from the word connection address composition section 106 is outputted, resulting in success in reading.

In particular, when the confidence degree of the candidate outputted from the supplementary address composition section 103 is low, an otherwise possible error which may appear when the supplementary address composition section 103 is used solely can be eliminated by outputting the address candidate outputted from the word connection address composition section 106. Naturally, where a correct address is stored in the habitation record storage section 105, since the likelihood of the candidate outputted from the supplementary address composition section 103 exceeds 40, this is adopted, and consequently, correct reading can be achieved.

Figure 12:
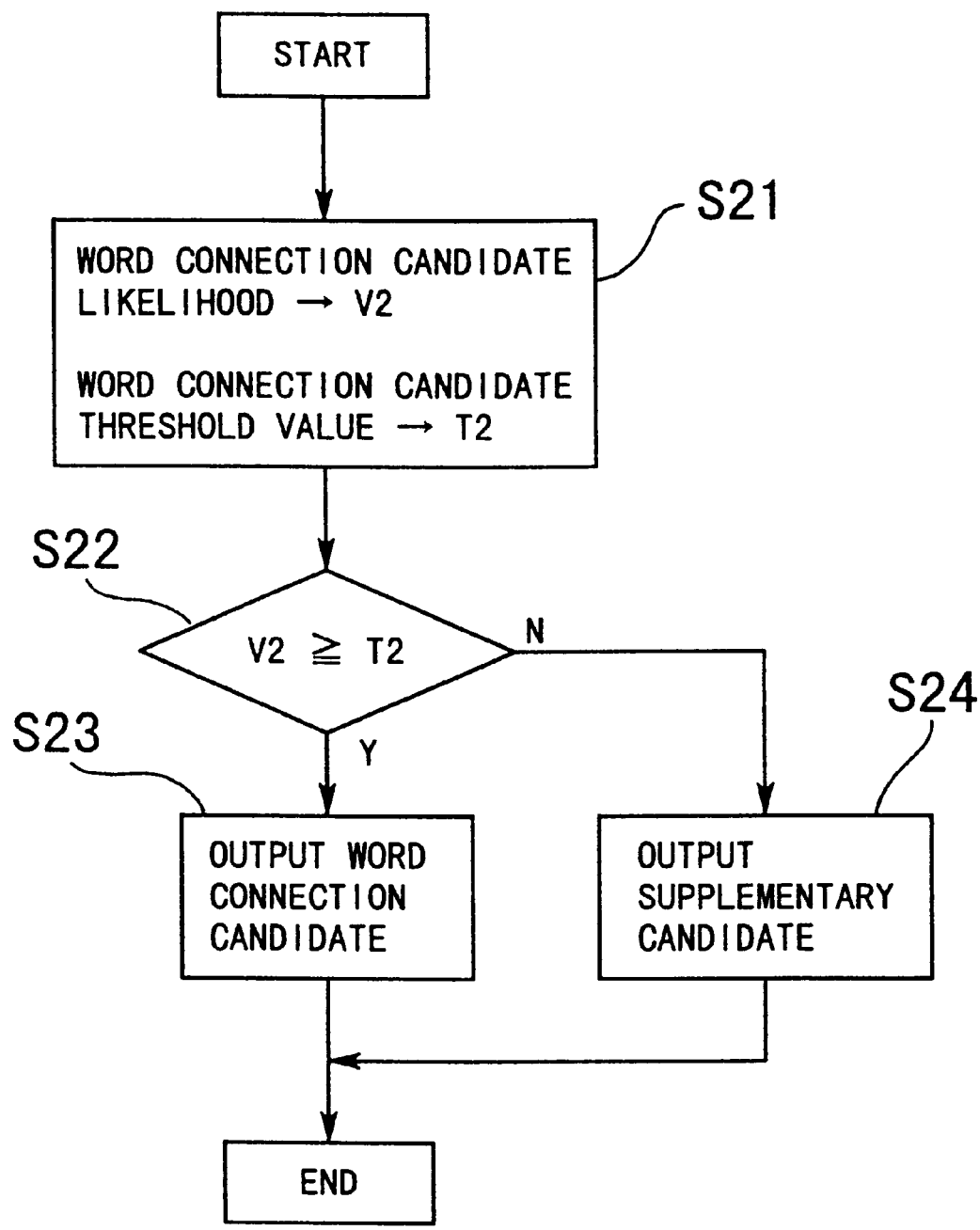

By the way, the discrimination processing of the output discrimination section 107 is not limited to the example described above with reference to FIG. 11. While, in the example illustrated in FIG. 11, whether or not the output of the supplementary address composition section 103 should be adopted is determined first using a threshold value, conversely whether or not the candidate outputted from the word connection address composition section 106 should be adopted may be determined first as seen from FIG. 12. Referring to FIG. 12, the likelihood of a candidate outputted from the word connection address composition section 106 is placed into a variable V2 and a threshold value for the candidate is placed into a variable T2 (step S21). If V2 is equal to or higher than T2, that is, if the likelihood is equal to or higher than the threshold value therefor (step S22), then the output discrimination section 107 outputs the address candidate outputted from the word connection address composition section 106 (step S23). On the contrary, if V2 is lower than T2, that is, if the likelihood is lower than the threshold value therefor, the output discrimination section 107 conversely outputs the address candidate outputted from the supplementary address composition section 103 (step S24).

Figure 13:
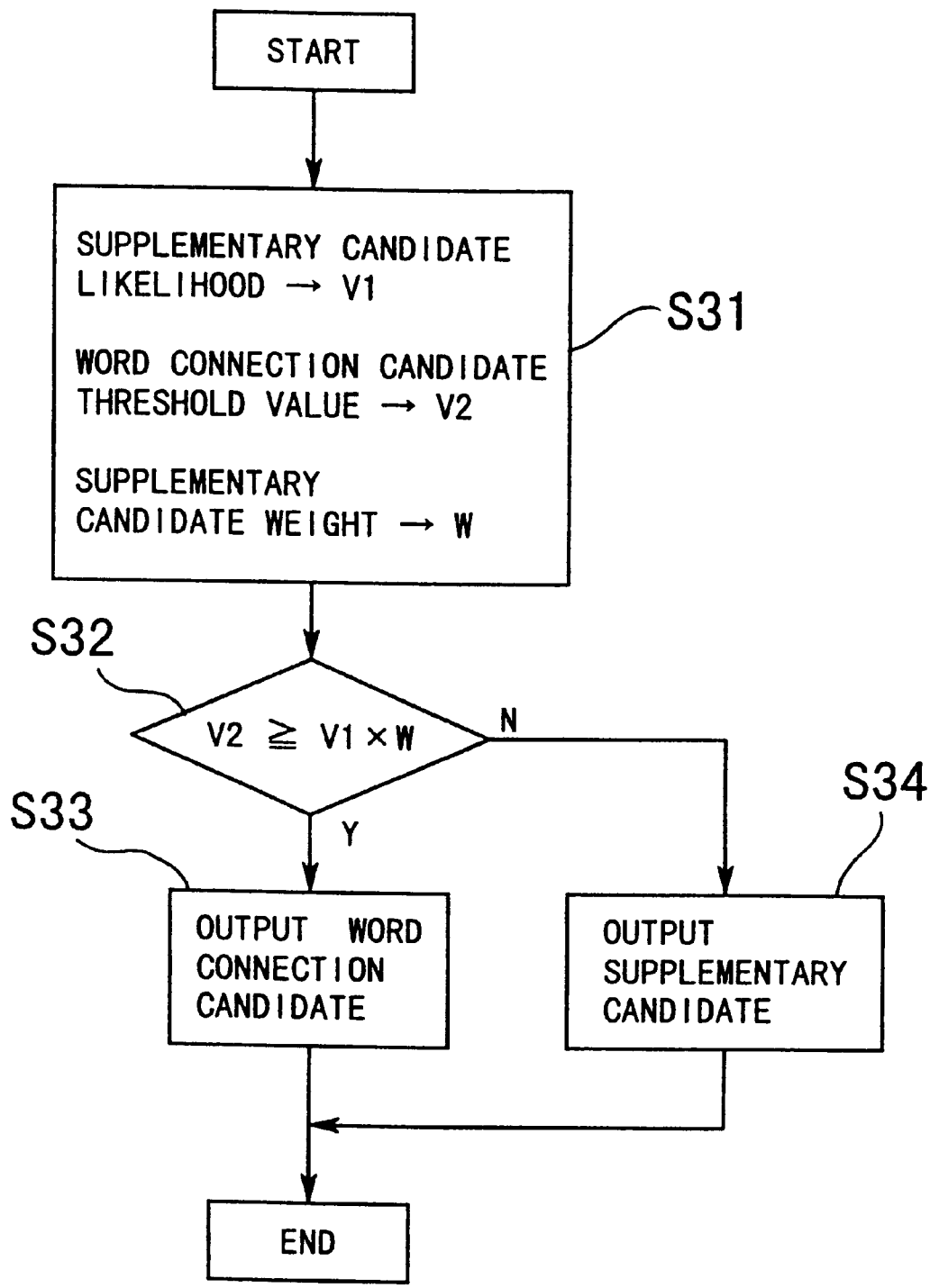

Further, which one of the output of the supplementary address composition section 103 and the output of the word connection address composition section 106 should be adopted need not be determined first, and it is otherwise possible to input the likelihoods of both of the candidates as parameters of a discriminant to determine which one of the two candidates should be adopted as can be seen in FIG. 13.

Referring to FIG. 13, the likelihood of an address candidate outputted from the supplementary address composition section 103 is placed into a variable V1 and a fixed coefficient is placed into a constant W and then the likelihood of an address candidate outputted from the word connection address composition section 106 is placed into another variable V2 (step S31). Then, the likelihood variable V2 is compared with a value obtained by multiplying the likelihood variable V1 by the coefficient W (step S32), and one of the two candidates which corresponds to that one of the likelihood variable V2 and the product which exhibits a higher value (steps S33 and S34). The weight W functions as a parameter for adjustment for determination of which one of the two candidates should be outputted preferentially.

Selection of one of the determination methods to be used should be performed by selecting a suitable system and a suitable threshold value depending upon the performances in character recognition and word recognition, the quality of data stored in the habitation record storage section 105, the ratio of data which are not registered by a miss and so forth.

More particularly, for example, where the data registered in the habitation record storage section 105 include many errors and/or many missing data which are not registered are present, whether or not a candidate outputted from the word connection address composition section 106 should be adopted is determined first, and the threshold value is set to a rather low value. Or, upon determination with the discriminant of FIG. 13, the weight W is set so that a candidate outputted from the word connection address composition section 106 may be rather preferential.

On the contrary where the contents of the habitation record storage section 105 are very sufficient, whether or not an a candidate outputted from the supplementary address composition section 103 should be adopted is determined first. Or, upon determination with the discriminant, the weight W is set so that a candidate outputted from the supplementary address composition section 103 may be rather preferential.

Further, in an actual use, when an address reading result is not very convincing, rather than to determine an address reading result positively, resulting in occurrence of an error, it is often preferable not to output a determination result but to request for judgment, for example, by manual operation to make a final determination.

Figure 14:
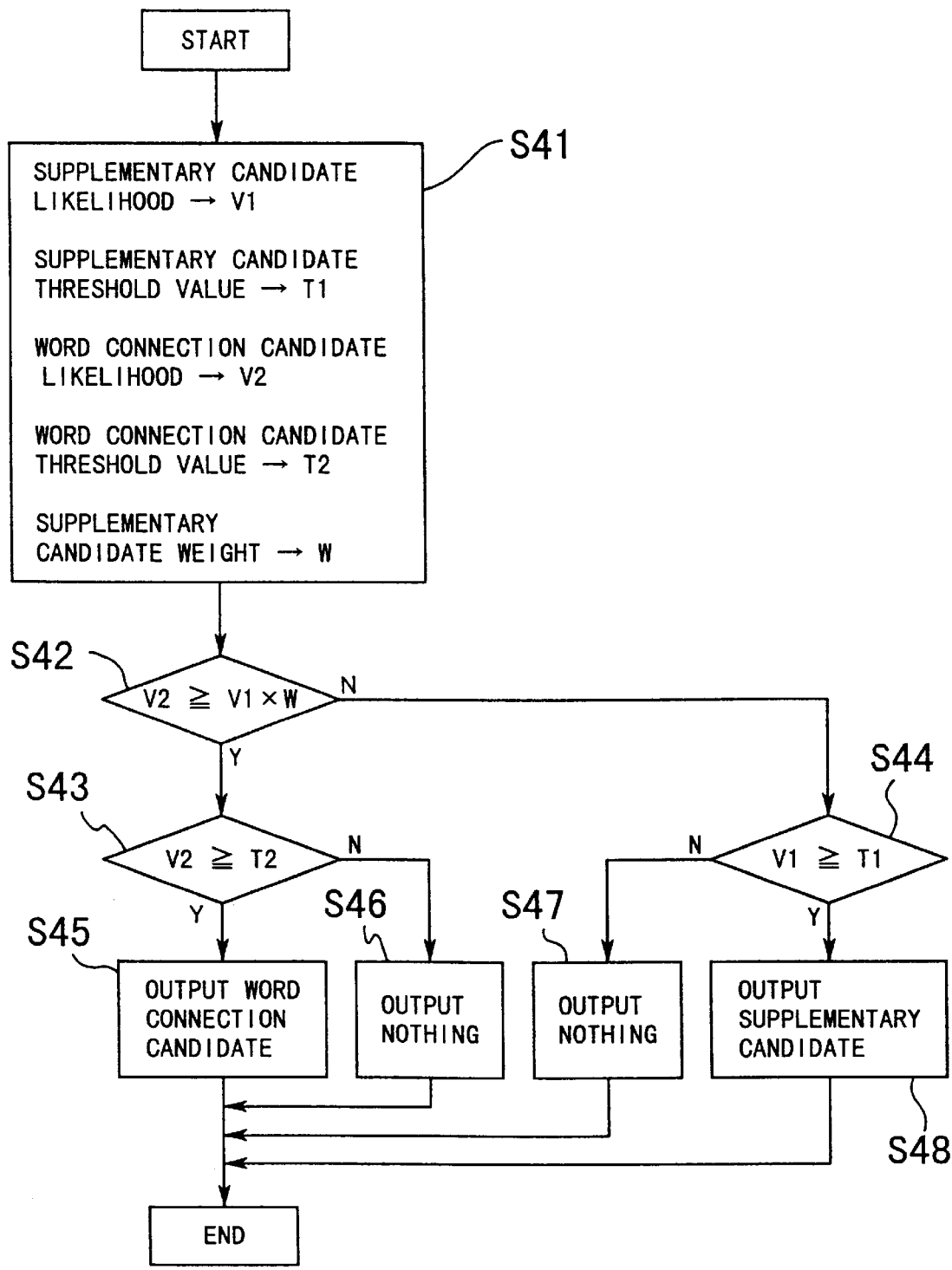

In the latter case, the processing operation of the output discrimination section 107 may adopt, as seen from FIG. 14, such determination that, in addition to the determination in the processing operation illustrated in FIG. 13, using both of a variable T1 for a candidate outputted from the supplementary address composition section 103 and another variable T2 for a candidate outputted from the word connection address composition section 106, it is checked whether or not sufficient likelihoods are available before outputting is performed. In particular, referring to FIG. 14, the likelihood of an address candidate outputted from the supplementary address composition section 103 is placed into a variable V1, the supplementary threshold value is placed into another variable T1, the likelihood of an address candidate outputted from the word connection address composition section 106 is placed into a further variable V2, the word connection candidate threshold value is placed into a still further variable T2 and the supplementary candidate weight is placed into a constant W (step S41). Then, the output discrimination section 107 compares a value obtained by multiplying the variable V1 of the address candidate outputted from the supplementary address composition section 103 by the weight W with the variable V2 of the address candidate outputted from the word connection address composition section 106 (step S42), and stores that one of the candidates which corresponds to a higher one of the two values as a temporary candidate. Then, if the temporary candidate is the address candidate outputted from the word connection address composition section 106, then the variable V2 of it is compared with the variable T2 set in advance (step S43). If the variable V2 of the output candidate outputted from the word connection address composition section 106 is equal to or higher than the variable T2, then the candidate is outputted (step S45), but if the variable V2 is lower than the variable T2, then nothing is outputted (step S46). On the other hand, if the temporary candidate is the address candidate outputted from the supplementary address composition section 103, then the variable V1 of it is compared with the variable T1 set in advance (step S44). Then, if the variable V1 of the address candidate is equal to or higher than the variable T1 set in advance, then the candidate is outputted (step S48), but if the variable V1 is lower than the variable T1, then nothing is outputted (step S47).

The programs of the processing illustrated in the flow charts of FIGS. 11 to 14 are recorded onto a recording medium such as a magnetic recording medium, a magneto-optical recording medium, an optical recording medium or the like so that they may be loaded into and executed by a computer.

Having now fully described the invention, it will be apparent to one of ordinary skill in the art that many changes and modifications can be made thereto without departing from the spirit and scope of the invention as set forth herein.

What is claimed is:

1. An address reading apparatus, comprising:
   a word storage section that stores words, wherein a subset of the words can be combined to form an address;
   an address rule storage section that stores rules that determine how words may be combined to form an address;

means for recognizing words that comprise a written address, wherein said means for recognizing accesses said word storage section and said address rule storage section for recognizing element words of the written address, and outputting at least one word candidate and an associated word likelihood for each recognized word;

a habitation record storage section that stores address records which exist as combinations of the words stored in said word storage section;

means for comparing word candidates outputted from said means for recognizing words with the records stored in said habitation record storage section with each other and outputting a record from the habitation record storage section which exhibits the highest likelihood of being the written address;

means for combining the word candidates outputted from said word recognition means to compose address candidates and for referring to said address rule storage section to output the address candidate which exhibits the highest likelihood of being the written address; and means for statistically judging the address candidate outputted from said means for comparing, and the address candidate outputted from said means for combining to determine a final address and outputting the final address.

2. The address reading apparatus as claimed in claim 1, wherein said means for statistically judging outputs the address candidate outputted from said means for comparing if the likelihood of the address candidate outputted from said means for comparing is equal to or higher than a threshold value determined in advance, but outputs the address candidate outputted from said means for combining if the likelihood of the address candidate outputted from said means for comparing is lower then the threshold value.

3. The address reading apparatus as claimed in claim 1, wherein said means for statistically judging outputs the address candidate outputted from said means for combining if the likelihood of the address candidate outputted from said means for combining is equal to or higher than a threshold value determined in advance, but outputs the address candidate outputted from said means for comparing if the likelihood of the address candidate outputted from said means for combining is lower then the threshold value.

4. The address reading apparatus as claimed in claim 1, wherein said means for statistically judging compares a value obtained by multiplying the likelihood of the address candidate outputted from said means for comparing by a fixed coefficient with the likelihood of the address candidate outputted from said means for combining and outputs that one of the candidates which exhibits the higher value.

5. The address reading apparatus as claimed in claim 1, wherein said means for statistically judging compares a value obtained by multiplying the likelihood of the address candidate outputted from said means for comparing by a fixed coefficient with the likelihood of the address candidate outputted from said means for combining and holds that one of the candidates which exhibits the higher value as a temporary candidate, and said means for statistically judging outputs the temporary candidate if the temporary candidate is equal to or higher than a threshold value determined in advance, but outputs nothing if the temporary candidate is lower than the threshold value.

6. A recording medium on which a program is recorded which causes an information processing apparatus to execute steps (a) to (d) set forth below:

(a) a word recognition step wherein a word storage section in which words of elements which compose addresses each of which may make an object of recognition and an address rule storage section in which rules which may be used to combine words of elements which may form an address to compose an address are stored are referred to to recognize element words of an address from within an image of a reading object;

(b) a supplementary address composition step wherein word candidates obtained as a result of the word recognition step and records stored in a habitation record storage section, in which records of habitations which exist as combinations of the words stored in said word storage section are stored, are compared with each other and one of the records which exhibits the highest likelihood is outputted;

(c) a word connection address composition step wherein the word candidates obtained as a result of the word recognition step are combined to compose address candidates and said address rule storage section is referred to to detect and output one of the address candidates which exhibits the highest likelihood; and (d) an output discrimination step wherein the address candidate obtained as a result of the word recognition step, the address candidate obtained as a result of the word connection address composition step, and the likelihoods of the individual address candidates are synthetically judged to determine a final address reading result and the final address reading result is outputted.

7. The address reading apparatus as recited in claim 1, wherein the habitation record storage stores a name of an individual and their mailing address.

8. The address reading apparatus as recited in claim 1, wherein said address rule storage section stores a first rule that provides hierarchical relationship information between place names.

9. The address reading apparatus as recited in claim 1, wherein said address rule storage section stores a second rule that a punctuation mark appears between a block number and a sub-block number.

10. The address reading apparatus as recited in claim 1, wherein said address rule storage section stores a third rule that provides information of square ranges and notations for individual street names.

* * * * *